(12) United States Patent
Zhao

(10) Patent No.: US 12,061,749 B1
(45) Date of Patent: Aug. 13, 2024

(54) KEYBOARD BASED ON KEY POSITION LAYOUT AND INPUT METHOD THEREOF APPLIED TO ELECTRONIC DEVICE

(71) Applicant: MIHUAN TECHNOLOGY (CHANGCHUN) CO., LTD., Changchun (CN)

(72) Inventor: Misheng Zhao, Changchun (CN)

(*) Notice: Subject to any disclaimer, the term of this patent is extended or adjusted under 35 U.S.C. 154(b) by 0 days.

(21) Appl. No.: 18/307,990

(22) Filed: Apr. 27, 2023

(51) Int. Cl.
G06F 3/02 (2006.01)
H01H 13/7057 (2006.01)

(52) U.S. Cl.
CPC ....... G06F 3/0219 (2013.01); H01H 13/7057 (2013.01)

(58) Field of Classification Search
CPC .... G06F 3/0219; G06F 3/018; G06F 3/04886; G06F 3/04895; H01H 13/7057
See application file for complete search history.

(56) References Cited

U.S. PATENT DOCUMENTS

2015/0109151 A1* 4/2015 Page ................... G06F 3/04886 341/22

* cited by examiner

Primary Examiner — Priyank J Shah
(74) Attorney, Agent, or Firm — Zhigang Ma

(57) ABSTRACT

The present invention discloses a keyboard based on key position layout and an input method thereof applied to an electronic device. The keyboard includes a keyboard body. The keyboard body is provided with a main key area formed by 25 keys, and 28 letter key positions are arranged in the main key area and are configured to display 28 input method letters. The input method letters are Chinese phonetic letters, calligraphical code letters or English Latin letters. On virtual keys of a virtual keyboard, dynamic substitution between input method letters in letter key positions is performed to display a currently used input method.

13 Claims, 16 Drawing Sheets

Upper key position

Left key position     Middle key position     Right key position

Middle left lower key position     Middle right lower key position

Lower key position

| Original scheme | New scheme | Name | Print form | Handwriting |
|---|---|---|---|---|
| A | A | The Chinese character 'a' | | |
| B | B | The Chinese character 'bo' | | |
| C | C | The Chinese character 'ci' | | |
| D | D | The Chinese character 'de' | | |
| E | E | The Chinese character 'e' | | |
| F | F | The Chinese character 'fo' | | |
| G | G | The Chinese character 'ge' | | |
| H | H | The Chinese character 'he' | | |
| I or Y | I | The Chinese character 'yi' | | |
| J | J | The Chinese character 'ji' | | |
| K | K | The Chinese character 'ke' | | |
| L | L | The Chinese character 'le' | | |
| M | M | The Chinese character 'mo' | | |
| N | N | The Chinese character 'ne' | | |
| O | O | The Chinese character 'o' | | |
| P | P | The Chinese character 'po' | | |
| Q | Q | The Chinese character 'qi' | | |
| R | R | The Chinese character 'ri' | | |
| S | S | The Chinese character 'si' | | |
| T | T or NG | Final tail of the Chinese character 'te' or 'ang' | | |
| U or W | U | The Chinese character 'wu' | | |
| ZH | V | The Chinese character 'zhi' | | |
| CH | W | The Chinese character 'chi' | | |
| X | X | The Chinese character 'xi' | | |
| SH | Y | The Chinese character 'shi' | | |
| Z | Z | The Chinese character 'zhi' | | |
| Ü | Ü | The Chinese character 'yu' | | |
| ER | Ë | The Chinese character 'er' | | |
| | | Ligature ending | | |

Chinese pinyin letters → New word

Fig. 1

| New word | | Tone |
|---|---|---|
| Print form | Handwriting | |
| ‾ | *e* | Flat tone |
| ∧ | *a* | Rising tone |
| X | *a* | Falling-rising Tone |
| V | *e* | Falling tone |
| ! | *a* | Neutral Tone |

Fig. 2

|  | I The Chinese character 'yi' | U The Chinese character 'wu' | Ü The Chinese character 'yu' |
|---|---|---|---|
| A The Chinese character 'a' | IA The Chinese character 'ya' | UA The Chinese character 'wa' |  |
| O The Chinese character 'o' |  | UO The Chinese character 'wo' |  |
| E The Chinese character 'e' | IE The Chinese character 'ye' |  | ÜE The Chinese character 'yue' |
| AI The Chinese character 'ai' |  | UAI The Chinese character 'wai' |  |
| EI The Chinese character 'ei' |  | UI The Chinese character 'wei' |  |
| AO The Chinese character 'ao' | IO The Chinese character 'yao' |  |  |
| OU The Chinese character 'ou' | IU The Chinese character 'you' |  |  |
| Ë The Chinese character 'er' |  |  |  |
| AN The Chinese character 'an' | IAN The Chinese character 'yan' | UAN The Chinese character 'wan' | ÜAN The Chinese character 'yuan' |
| EN The Chinese character 'en' | IN The Chinese character 'yin' | UN The Chinese character 'wen' | ÜN The Chinese character 'yun' |
| AT The Chinese character 'ang' | IAT The Chinese character 'yang' | UAT The Chinese character 'wang' |  |
| ET The Chinese character 'eng' | IT The Chinese character 'ying' | UT The Chinese character 'weng' |  |
| OT The Chinese character 'hong' | IOT The Chinese character 'yong' |  |  |

Fig. 3

| Esc<br>• J ~<br>⊕ | Flight<br>00 I 000<br>F6 | Setting<br>— Q —<br>☺ ↵ | window selection<br>= N +<br>F7 | Line beginning<br>← X Del<br>CH/EN |
|---|---|---|---|---|
| Editing<br>【 B {<br>Size | Refreshing<br>7 U &<br>F5 | Screenshot<br>8 P *<br>Ü | Projection<br>9 M (<br>F8 | Line end<br>, F 《<br>Chinese/English |
| Tab<br>】Z }<br>complete/simplified | Window closing<br>4 A ¥<br>F4 | Adding<br>5 C %<br>O | Key light<br>6 D ⋯<br>F9 | Previous page<br>。 S 》<br>Sound form |
| Capital<br>、 G \|<br>Numeric marks | Mute<br>1 E !<br>F3 | Five tones<br>2 K @<br>Ë | Screen off<br>3 T #<br>F10 | Next page<br>/ H ?<br>simplified/<br>traditional |
| Volume down<br>; V :<br>F1 | Volume up<br>0 R )<br>F2 | ▲<br>W<br>▼ ␣ | Light down<br>. L '<br>F11 | Light up<br>' Y " "<br>F12 |

Fig. 8

| ↵<br>Up gear  Start | Ü<br>Control | O<br>Function | Ë<br>Window | ␣<br>Exchange  Menu |
|---|---|---|---|---|

Fig. 9

| 1 J 2 | 1 I 2 | 1 Q ' 2 ↵ | 1 N 2 | 1 X 2 |
| --- | --- | --- | --- | --- |
| 1 B 2 | 1 U 2 | 1 P 1 Ü | 1 M 2 | 1 F 2 |
| 1 Z 2 | 1 A 2 | 1 C 1 O | 1 D 2 | 1 S 2 |
| 1 G 2 | 1 E 2 | 1 K 1 Ë | 1 T 2 | 1 H 2 |
| 1 V 2 | 1 R 2 | 1 ←W 2 ␣ | 1 L 2 | 1 Y 2 |

Fig. 22

| 4 J | 2 I | 1 Q ' ↵ | 3 N | 5 X |
|---|---|---|---|---|
| 9 B | 7 U | 6 P Ü | 8 M | 10 F |
| 14 Z | 12 A | 11 C O | 13 D | 15 S |
| 19 G | 17 E | 16 K Ë | 18 T | 20 H |
| 24 V | 22 R | 21 ← W ␣ | 23 L | 25 Y |

Fig. 23

| Esc <br> ` W ~ <br> ⊕ | Flight <br> 00 E 000 <br> F6 | Setting <br> — R _ <br> 😀 ↵ | window selection <br> = T + <br> F7 | Line beginning <br> ← Y Del <br> CH/EN |
|---|---|---|---|---|
| Editing <br> [ U { <br> Size | Refreshing <br> 7 I & <br> F5 | Screenshot <br> 8 O * <br> Ü | Projection <br> 9 P ( <br> F8 | Line end <br> , A < <br> Chinese/English |
| Tab <br> ] S } <br> complete/simplified | window closing <br> 4 D $ <br> F4 | Adding <br> 5 F % <br> Q | Key light <br> 6 G ^ <br> F9 | Previous page <br> . H > <br> Sound form |
| Capital <br> \ J \| <br> Numeric marks | Mute <br> 1 K ! <br> F3 | Five tones <br> 2 L @ <br> Ë | Screen off <br> 3 Z # <br> F10 | Next page <br> / X ? <br> simplified/traditional |
| Volume down <br> ; C : <br> F1 | Volume up <br> 0 V ) <br> F2 | ▲ <br> B <br> ▼ ␣ | Light down <br> . N ' <br> F11 | Light up <br> ' M " <br> F12 |

Fig. 26

KEYBOARD BASED ON KEY POSITION LAYOUT AND INPUT METHOD THEREOF APPLIED TO ELECTRONIC DEVICE

TECHNICAL FIELD

The present invention relates to the technical field of keyboard layout and input methods, and in particular to a keyboard based on key position layout and an input method thereof applied to an electronic device.

BACKGROUND

Currently, Qwerty keyboard, which was created in the United States in 1870s, is still being used in computers. For mobile phones, a simplified version of the Qwerty keyboard is used, which includes 26 English Latin alphabet keys and the most commonly used symbols, layout of the English Latin alphabet keys on this keyboard is the same as that of the Qwerty keyboard. Later, a T9 keyboard was designed for mobile phones. In terms of watches, there is a TouchOne keyboard and the like. However, the Qwerty keyboard, the T9 keyboard and the TouchOne keyboard have significant layout differences, and there is no inheritance or association of the basic architecture. For Chinese characters and Chinese, the English Qwerty keyboard is borrowed, not owned, and is essentially not suitable for the needs of Chinese characters and Chinese. The failure of calligraphical code input methods designed based on the English Qwerty keyboard, such as the Wubizixing input method, the Zhengma input method, and the Shuangpin input method, is a clear proof. High learning costs, multiple word roots and cumbersome coding rules are common drawbacks of the calligraphical code input methods, and double spelling input methods have the disadvantage of losing fast simplified spelling. And the English Qwerty keyboard is not suitable for single finger manipulation on mobile phones and is not suitable for watches. In order to solve the above problems, the Chinese invention patent application discloses a keyboard with novel key position layout and a multi-spelling input method applied to an electronic device. For details, please see publication No. CN110096162A. In terms of the Chinese phonetic input method, the input method is entirely based on the 1958 Chinese phonetic scheme, which has 4 double-letter sounds ZH, CH, SH and NG, as well as two vowels I and U that are to be added or replaced with Y and W when serving as initial sounds in syllables. There is also a Ü beyond 26 English Latin letters, a syllable-dividing mark in English, as well as a four-tone tone marking method that cannot be widely used, making the input method be difficult to operate and popularize, therefore, we provide a keyboard based on key position layout and an input method thereof applied to an electronic device to solve the above problems.

SUMMARY

The present invention aims to overcome the above technical problems, provides a keyboard based on key position layout and an input method thereof applied to the electronic device, so as to enable multiple platforms such as computers, mobile phones, watches, and mice to have a common key position layout and input method and learning costs to be low.

To solve the above technical problems, the present invention provides a keyboard based on key position layout including a keyboard body. The keyboard body is provided with a main key area formed by 25 keys arranged in an array of 5 rows and 5 columns. Each key is divided into seven key positions which include A key position, B key position, middle key position, C key position, D key position, E key position and F key position from top to bottom and from left to right sequentially. 28 letter key positions formed by all middle key positions of the 25 keys in the main key area and E key positions of 3 keys are configured to display and in one-to-one correspondence with 28 input method letters.

The each key is divided into seven key positions including upper key position, left key position, middle key position, right key position, middle left lower key position, middle right lower key position and lower key position from top to bottom and from left to right sequentially.

The upper key position is called the A key position, and the left key position is called the B key position, and the middle key position is called a natural number named key position, and the right key position is called the C key position, and the middle left lower key position is called the D key position, and the middle right lower key position is called the E key position, and the lower key position is called the F key position.

The seven key positions occupy seven partitions, and the position of A key position is called upper partition, and the position of B key position is called left partition, and the position of middle key position is called middle partition, and the position of C key position is called right partition, the position of D key position is called middle left lower partition, and the position of E key position is called middle right lower partition, and the position of F key position is called lower partition.

The input method of the keyboard based on key position layout for the electronic device, where the keyboard based on key position layout is used, and input method letters are Chinese phonetic letters, calligraphical code letters and English Latin letters.

On virtual keys of a virtual keyboard, and dynamic substitution between Chinese phonetic letters, calligraphical code letters and English Latin letters in letter key positions is performed to display a currently used input method.

On keys of a physical keyboard, Chinese phonetic letters, calligraphical code letters and English Latin letters are shown simultaneously in letter key positions in different areas, and after the input method is determined, and the Chinese phonetic letters, the calligraphical code letters and the English Latin letters respond correspondingly according to the current input method.

After one key of input method letters is input, and the remaining empty upper, left, right, lower or middle right lower partitions except upper, left, right, lower or middle right lower partitions where the 28 input method letters, a determining mark, a space mark, a backspace mark and a syllable-dividing mark are located are used as candidate columnstodisplaywords or phrases searched through various input methods.

Content displayed in the middle key position of each key is input by clicking the key. Content displayed in the A key position of the key is input or implemented by pressing and holding the key and sliding upward. Content displayed in the B key position of the key is input or implemented by pressing and holding the key and sliding leftward. Content displayed in the C key position of the key is input or implemented by pressing and holding the key and sliding rightward. Content displayed in the D key position of the key is a key combination function key, and predetermined key combination functions are implemented by long pressing the key and clicking other related keys. Content displayed in the E key position of the key is input by long pressing the key. Content displayed in the F key position of the key is input or implemented by pressing and holding the key and sliding downward.

As an improvement, after a first key for each syllable is input, and 28 letters are individually formed into syllables, where each of 27 letters is spelled with a certain single vowel, and the single vowel part therein is omitted, which is called no pre-spelling, requiring manual input of a syllable-dividing mark. Words searched by inputting letter j, i, q, n, x, z, c, or s are displayed in first 4 left and right candidate columns of first row of keys.

Words searched by inputting letter b, u, p, m or f are displayed in first 4 left and right candidate columns of second row of keys.

Words searched by inputting letter a are displayed in first 4 left and right candidate columns of third row of keys.

Words searched by inputting letter g, e, k, h, d, t or l are displayed in first 4 left and right candidate columns of fourth row of keys.

Words searched by inputting letter v, r, w, y, ü or o are displayed in first 4 left and right candidate columns of fifth row of keys.

After another letter ë is input, and ë does not spell with other monophthongs, and when a syllable is completed, and a syllable-dividing mark is added automatically. Searched first-tone words are displayed in a total of 16 candidate columns on left, right, lower and middle right lower sides of first two and last two keys of the first row. Searched second-tone words are displayed in a total of 16 candidate columns on left, right, lower, and middle right lower sides of first two and last two keys of the second row. Searched third-tone words are displayed in a total of 16 candidate columns on left, right, lower, and middle right lower sides of first two and last two keys of the third row. Searched fourth-tone words are displayed in a total of 16 candidate columns on left, right, lower, and middle right lower sides of first two and last two keys of the fourth row Searched fifth-tone words are displayed in a total of 16 candidate columns on left, right, lower, and middle right lower sides of first two and last two keys of the fifth row.

As an improvement, after the first key for each syllable is input, and an entered letter has a simplified spelling with another letter, which is called a pre-simplified spelling. In the case of pre-simplified spelling, and searched words are displayed in upper candidate columns of 25 keys and lower candidate columns of 3 keys. An entered letter has a pre-simplified spelling with a middle key position letter of a certain key, and then searched words are displayed in upper candidate column of the key. An entered letter has a pre-simplified spelling with an E key position letter of a certain key, and then searched words are displayed in lower candidate column of the key.

As an improvement, after the first key for each syllable is input, and an entered letter has a complete spelling with another letter or final, which is called a pre-complete spelling. Words searched by pre-complete spelling with i are displayed in first 4 left and right candidate columns of the first row of keys.

Words searched by pre-complete spelling with u are displayed in first 4 left and right candidate columns of the second row of keys.

Words searched by pre-complete spelling with a are displayed in first 4 left and right candidate columns of the third row of keys.

Words searched by pre-complete spelling with e are displayed in first 4 left and right candidate columns of the fourth row of keys.

Words searched by pre-complete spelling with ü or o are displayed in first 4 left and right candidate columns of the fifth row of keys.

Words searched by pre-complete spelling with n are displayed in last 4 left and right candidate columns of the first row of keys.

Words searched by pre-complete spelling with an are displayed in last 4 left and right candidate columns of the second row of keys.

Words searched by pre-complete spelling with ai are displayed in last 4 left and right candidate columns of the third row of keys.

Words searched by pre-complete spelling with t are displayed in last 4 left and right candidate columns of the fourth row of keys.

Words searched by pre-complete spelling with at are displayed in last 4 left and right candidate columns of the fifth row of keys.

As an improvement, after the first key for each syllable is input, and an entered letter has a complete spelling with another letter or final, which is called a pre-complete spelling. Words searched by pre-complete spelling with ei are displayed in 4 lower candidate columns of first two and last two keys of the first row.

Words searched by pre-complete spelling with ou are displayed in 4 lower candidate columns of first two and last two keys of the second row.

Words searched by pre-complete spelling with ao are displayed in 4 lower candidate columns of first two and last two keys of the third row.

Words searched by pre-complete spelling with ot are displayed in 4 lower candidate columns of first two and last two keys of the fourth row.

Words searched by pre-complete spelling with ue are displayed in 4 lower candidate columns of first two and last two keys of the fifth row.

As an improvement, after the first key for each syllable is input, and an entered letter has a complete spelling with another letter or final, which is called a pre-complete spelling. Words searched by pre-complete spelling with ia or ua are displayed in first two middle right lower candidate columns of the first row of keys.

Words searched by pre-complete spelling with ie or uai are displayed in last two middle right lower candidate columns of the first row of keys.

Words searched by pre-complete spelling with io or uat are displayed in first two middle right lower candidate columns of the second row of keys.

Words searched by pre-complete spelling with ian are displayed in last two middle right lower candidate columns of the second row of keys.

Words searched by pre-complete spelling with in or ui are displayed in first two middle right lower candidate columns of the third row of keys.

Words searched by pre-complete spelling with iat are displayed in last two middle right lower candidate columns of the third row of keys.

Words searched by pre-complete spelling with it are displayed in first two middle right lower candidate columns of the fourth row of keys.

Words searched by pre-complete spelling with uo are displayed in last two middle right lower candidate columns of the fourth row of keys.

Words searched by pre-complete spelling with uan are displayed in first two middle right lower candidate columns of the fifth row of keys.

Words searched by pre-complete spelling with un are displayed in last two middle right lower candidate columns of the fifth row of keys.

Words searched by pre-complete spelling with iu are displayed in lower candidate columns of Q key and W key.

As an improvement, after a second key for each syllable is input, and an entered letter has a pre-simplified spelling with another arbitrary letter, and a pre-simplified spelling display mode is applied.

After two keys for one syllable are input, and if first two keys are spellable, and continuous pre-complete spelling still exists, and searched words are displayed in left and right candidate columns, and a pre-complete spelling display mode is applied.

Even if entered letters are spellable, and there is still a calculation channel that is completely processed according to simplified spelling, and first-tone words searched according to no pre-simplified spelling are displayed in lower and middle right lower candidate columns of first two and last two keys of the first row. Second-tone words searched according to no pre-simplified spelling are displayed in lower and middle right lower candidate columns of first two and last two keys of the second row. Third-tone words searched according to no pre-simplified spelling are displayed in lower and middle right lower candidate columns of first two and last two keys of the third row. Fourth-tone words searched according to no pre-simplified spelling are displayed in lower and middle right lower candidate columns of first two and last two keys of the fourth row. Fifth-tone words searched according to no pre-simplified spelling are displayed in lower and middle right lower candidate columns of first two and last two keys of the fifth row.

Entered letters are not spellable, and then searched first-tone words are displayed in 16 left, right, lower and middle right lower candidate columns of first two and last two keys of the first row. Searched second-tone words are displayed in 16 left, right, lower, and middle right lower candidate columns of first two and last two keys of the second row. Searched third-tone words are displayed in 16 left, right, lower, and middle right lower candidate columns of first two and last two keys of the third row. Searched fourth-tone words are displayed in 16 left, right, lower, and middle right lower candidate columns of first two and last two keys of the fourth row. Searched fifth-tone words are displayed in 16 left, right, lower, and middle right lower candidate columns of first two and last two keys of the fifth row. A five-tone display mode is applied.

After a syllable-dividing mark is manually input for a second key, and the five-tone display mode is applied.

A syllable tail letter is input for the second key, and one syllable is completed, and a syllable-dividing mark is added automatically, and the five-tone display mode is applied.

After a third key is input, and each syllable is processed the same way with that after input of the second key.

After a fourth key for each syllable is input, and a syllable-dividing mark is added automatically, and the five-tone display mode is applied.

As an improvement, when Chinese phonetic input exceeds a certain number of syllables and has a pre-simplified spelling, neither left and right candidate columns nor middle right lower candidate columns have enough space for complete display, and then the input is displayed in upper candidate columns. According to no pre-simplified spelling, and searched first-tone words are displayed in 4 lower candidate columns of first two and last two keys of the first row. Searched second-tone words are displayed in 4 lower candidate columns of first two and last two keys of the second row. Searched third-tone words are displayed in 4 lower candidate columns of first two and last two keys of the third row. Searched fourth-tone words are displayed in 4 lower candidate columns of first two and last two keys of the fourth row. Searched fifth-tone words are displayed in 4 lower candidate columns of first two and last two keys of the fifth row.

As an improvement, after inputting a few key codes for a calligraphical code simplified spelling, and entered key codes have a simplified spelling with a key code of a middle key position of a key, and 25 words with first word frequency ranking are displayed in the upper candidate column of the key where the key code is located, and 22 words with second word frequency ranking are displayed in the lower candidate column of the key where the key code is located. The entered key codes have a simplified spelling with a key code of a middle right lower key position of a key, and 3 words with first word frequency ranking are displayed in the lower candidate column of the key where the key code is located. A syllable-dividing mark is input during the calligraphical code simplified spelling to terminate the simplified spelling, simply spelled words of a certain number of words are searched after the certain number of key codes are input, and the simply spelled words are displayed according to word or phrase frequency ranking.

As an improvement, after inputting a few key codes for a calligraphical code complete spelling, and entered key codes have a complete spelling with a key code of a middle key position of a key, and 24 words with first word frequency ranking are displayed in the left candidate column of the key where the key code is located, and 1 word with first word frequency ranking is displayed in the right candidate column of the key where the key code is located. The entered key codes have a complete spelling with a key code of a middle right lower key position of a key, and 3 words with first word frequency ranking are displayed in the right candidate column of the key where the key code is located. 20 words with second word frequency ranking are displayed in the right candidate column of the key where the key code is located. 20 words with third word frequency ranking are displayed in the middle right lower candidate column of the key where the key code is located. A syllable-dividing mark is input during the calligraphical code complete spelling to terminate the complete spelling, four key codes are enough for one word, finally remaining one, two, or three key codes are also counted as one word, completely spelled words of a certain number of words are searched after the certain number of key codes are input, and the completely spelled words are displayed according to word or phrase frequency ranking.

As an improvement, after one key of letter is input in an English input method, and the next key, which is a word with a certain first unentered letter, is displayed in the candidate column of the key with the certain letter in the middle key position, and only subsequent parts of the first unentered letter are displayed in the candidate column. Sliding once or pressing and holding for input is performed to determine entered letters being not determined to be on screen+the letter in the middle key position+letter strings displayed in the relevant candidate columns to be on the screen, or to determine the entered letters being not determined to be on screen+the letter in the middle right lower key position+the letter strings displayed in the relevant candidate columns to be on the screen.

As an improvement, after one key of letter is input in an English input method, and the next key is a word with the letter Q, and the subsequent letter string of Q is displayed in the lower candidate column of the F key. The next key is a word with the letter F and the subsequent letter string of F is displayed in the remaining three candidate columns of the F key.

The next key is a word with the letter R and the subsequent letter string of R is displayed in the upper, left and lower candidate columns of the R key;

The next key is a word with the letter B and the subsequent letter string of B is displayed in the upper, right and lower candidate columns of the B key.

The next key is a word with the letter O or L and the subsequent letter string of O or L is displayed in the upper, lower, left and right candidate columns of the O or L key.

The next key is a word with each of the remaining 20 letters and the subsequent letter string of each letter is displayed in the upper, lower, left, right and middle right lower candidate columns of the key where the letter is located.

With the adoption of the above method, the present invention has the following advantages:

I. The Chinese phonetic input method based on the new Chinese phonetic scheme of the present invention simplifies phonetic and can achieve convenient Chinese phonetic input on computers, mobile phones, watches, mice and other devices, and has the advantages of easy learning, high input efficiency, and low error rate.

II. The present invention uses a unified set of 28 Chinese phonetic letters, English Latin letters and calligraphical code letters to facilitate switching between the three types of letters.

III. By means of 25-key layout as the basis of multiple keyboards in the present invention, multiple keyboard layouts are not required to be memorized for input from multiple platforms such as computers, mobile phones and watches, and learning costs are low.

IV. The present invention cancels the existing candidate column way, making the relevant key positions of each key become candidate columns, and the number of candidate words and words increases significantly, making input faster.

The above summary is for the purpose of the specification only and is not intended to apply limits in any way. In addition to the illustrative aspects, implementation manners and features described above, further aspects, implementation manners and features of the present invention will be readily apparent by reference to the drawings and the following detailed description.

DESCRIPTION OF DRAWINGS

FIG. 1 is a schematic diagram of a comparison table between Chinese phonetic letters and New word in the present invention.

FIG. 2 is a schematic diagram of a five-tone table of New word in the present invention.

FIG. 3 is a schematic diagram of a final table in a new Chinese phonetic scheme in the present invention.

FIG. 8 is a schematic diagram of layout of 28 Chinese phonetic letters on 25 keys in a main key area according to an example of the present invention.

FIG. 9 is a schematic diagram of layout of Chinese phonetic letters on five keys in sixth row added outside a main key area according to an example of the present invention.

FIG. 22 is a schematic diagram of word frequency ranking displayed in pre-simplified spelling of a calligraphical code input method according to an example of the present invention.

FIG. 23 is a schematic diagram of word frequency ranking displayed in pre-simplified spelling of a calligraphical code input method after a syllable-dividing mark is input according to an example of the present invention.

FIG. 26 is a schematic diagram of layout of 28 English letters on 25 keys in a main key area according to an example of the present invention.

In order to describe the technical solutions in the examples of the present application or in the prior art more clearly, the drawings that need to be used in the description of the examples or the prior art are briefly introduced below. Apparently, the drawings in the description below show merely some examples of the present application, and those of ordinary skill in the art may also acquire other drawings based on these drawings without any creative efforts.

DETAILED DESCRIPTION OF EXAMPLES

Only some illustrative examples are briefly described below. As those skilled in the art may recognize, the described examples may be modified in various ways without departing from the spirit or scope of the present invention. Therefore, the drawings and descriptions are considered to be illustrative rather than restrictive in nature.

Examples of the present invention are described in detail below in conjunction with the accompanying drawings.

Combined with FIG. 1 to FIG. 27, according to the new Chinese phonetic scheme and the comparison table between Chinese phonetic letters and New Words, Latin letters Ü and Ë are newly added, there are 28 English Latin letters and 28 Chinese phonetic letters, and Chinese phonetic letters or New Words represents calligraphical code letters. In the new Chinese phonetic scheme, V replaces ZH, W replaces CH, Y replaces SH, and T concurrently replaces NG. New five-tone words are designed, Ü represents the Chinese character 'Yu', and Ë represents the Chinese character 'er'. When the tone of the syllable at the end of a word is a neutral tone, tone marking is omitted. The present invention relates the relevant speech sounds in a new Chinese speech classification table to key positions on 25 keys arranged in an array of 5 rows and 5 columns to form a keyboard with new key position layout. See FIG. 1, FIG. 2 and FIG. 3 for a comparison table between Chinese phonetic letters and Sin wenz, a tone table and a final table in a new Chinese phonetic scheme.

A keyboard based on key position layout includes a keyboard body, where the keyboard body is provided with a main key area formed by 25 keys arranged in an array of 5 rows and 5 columns, and each key is divided into seven key positions which include A key position, B key position, middle key position, C key position, D key position, E key position and F key position from top to bottom and from left to right sequentially, where 28 letter key positions formed by all middle key positions of the 25 keys in the main key area and E key positions of 3 keys are configured to display and in one-to-one correspondence with 28 input method letters.

Figure 4:
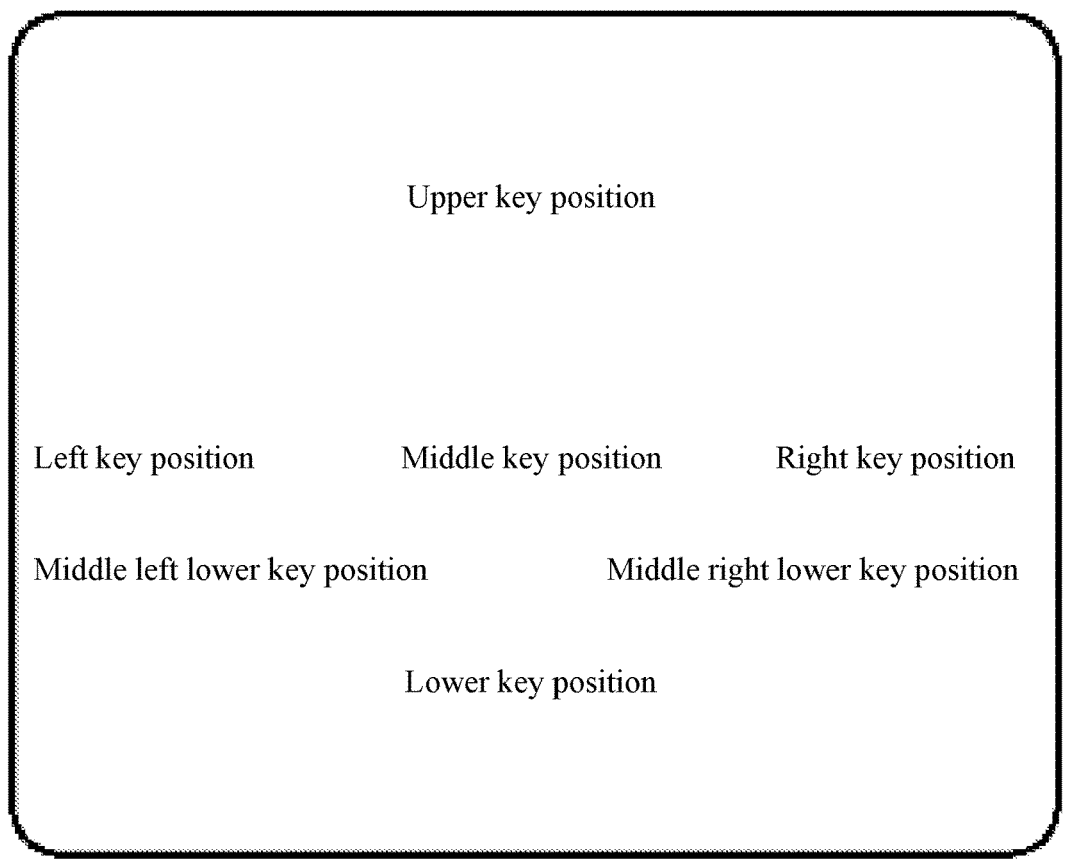
FIG. 4 is a schematic diagram of names of seven key positions on each key in the present invention.

The upper surface of each key is divided into seven key positions, including upper key position, left key position, middle key position, right key position, middle left lower key position, middle right lower key position and lower key position from top to bottom and from left to right sequentially, see FIG. 4.

Figure 5:
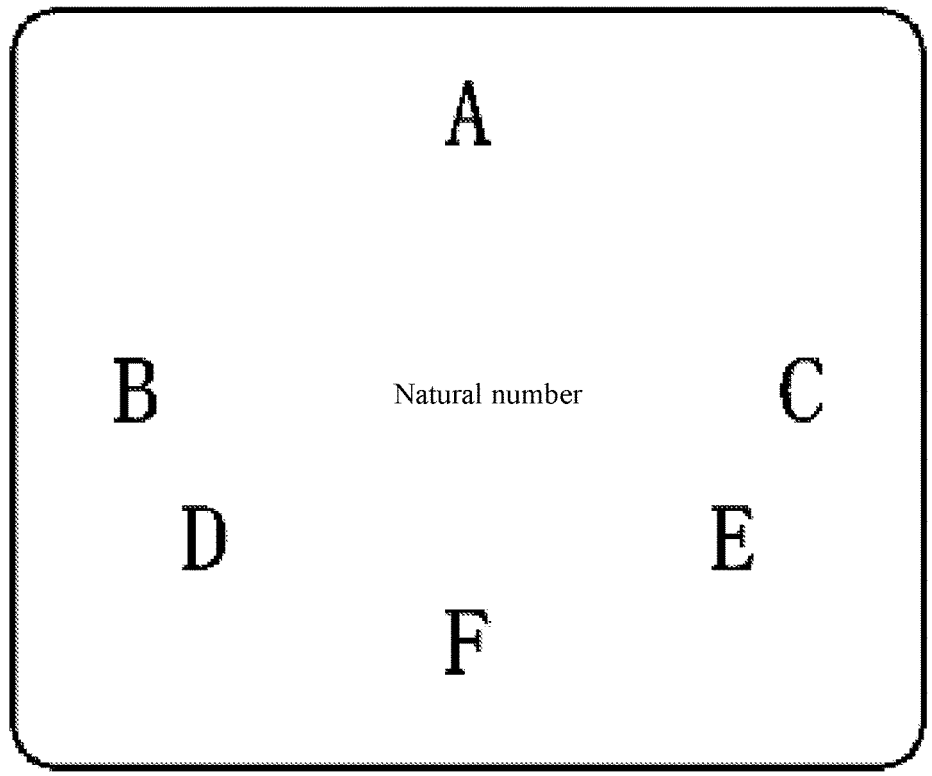
FIG. 5 is a schematic diagram of codes of seven key positions on each key in the present invention.

The upper key position is called the A key position, the left key position is called the B key position, the middle key position is called a natural number named key position, the right key position is called the C key position, the middle left lower key position is called the D key position, the middle right lower key position is called the E key position, and the lower key position is called the F key position, see FIG. 5.

Seven key positions occupy seven partitions. The position of A key position is called upper partition. The position of B key position is called left partition. The position of middle key position is called middle partition. The position of C key position is called right partition. The position of D key position is called middle left lower partition. The position of E key position is called middle right lower partition. The position of F key position is called lower partition; see FIG. 6.

An input method of the keyboard based on key position layout for the electronic device, where the keyboard based on key position layout is used, and input method letters are Chinese phonetic letters, calligraphical code letters and English Latin letters.

On virtual keys of a virtual keyboard, dynamic substitution between Chinese phonetic letters, calligraphical code letters and English Latin letters in letter key positions is performed to display a currently used input method.

On keys of a physical keyboard, Chinese phonetic letters, calligraphical code letters and English Latin letters are shown simultaneously in letter key positions in different areas, and after the input method is determined, the Chinese phonetic letters, the calligraphical code letters and the English Latin letters respond correspondingly according to the current input method.

After one key of input method letters is input, the remaining empty upper, left, right, lower or middle right lower partitions except upper, left, right, lower or middle right lower partitions where the 28 input method letters, a determining mark, a space mark, a backspace mark and a syllable-dividing mark are located are used as candidate columnstodisplaywords or phrases searched through various input methods.

Content displayed in the middle key position of each key is input by clicking the key. Content displayed in the A key position of the key is input or implemented by pressing and holding the key and sliding upward. Content displayed in the B key position of the key is input or implemented by pressing and holding the key and sliding leftward. Content displayed in the C key position of the key is input or implemented by pressing and holding the key and sliding rightward. Content displayed in the D key position of the key is a key combination function key, and predetermined key combination functions are implemented by long pressing the key and clicking other related keys. Content displayed in the E key position of the key is input by long pressing the key. Content displayed in the F key position of the key is input or implemented by pressing and holding the key and sliding downward.

Figures 6, 7:
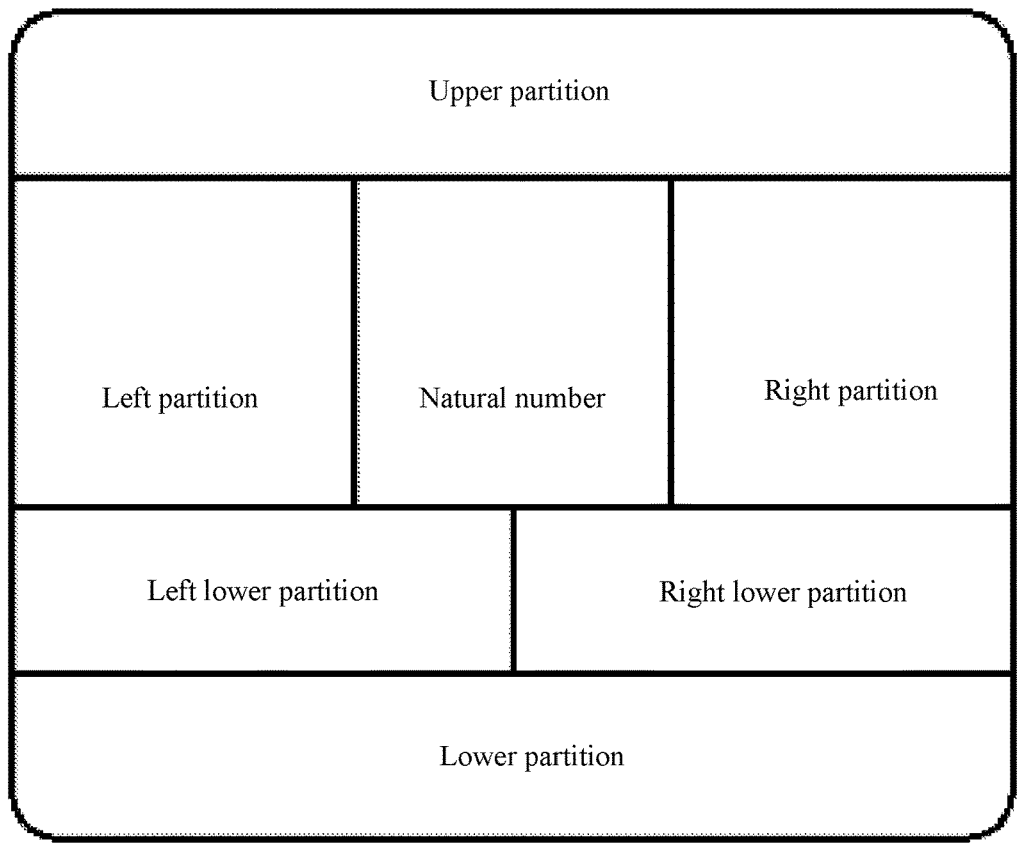
FIG. 6 is a schematic diagram of seven partitions on each key in the present invention.
FIG. 7 is a schematic diagram of digital coding of a middle key position of each of 25 keys in a main key area according to an example of the present invention.

See FIG. 7, the digit numbers of middle key positions of the 25 keys arranged in an array of 5 rows and 5 columns are as follows, from top to bottom and from left to right:

Key positions 1, 2, 3, 4 and 5 are in the first row.
Key positions 6, 7, 8, 9 and 10 are in the second row.
Key positions 11, 12, 13, 14 and 15 are in the third row.
Key positions 16, 17, 18, 19 and 20 are in the fourth row.
Key positions 21, 22, 23, 24 and 25 are in the fifth row.

EXAMPLES

The specific layout of the Chinese phonetic letters for 25-key keyboard arranged in an array of 5 rows and 5 columns is as follows:

Key position 1 displays J, and key position 2 displays I, and key position 3 displays Q, and key position 4 displays N, and key position 5 displays X. Key position 6 displays B, and key position 7 displays U, and key position 8 displays P, and key position 9 displays M, and key position 10 displays F. Key position 11 displays Z, and key position 12 displays A, and key position 13 displays C, and key position 14 displays D, and key position 15 displays S. Key position 16 displays G, and key position 17 displays E, and key position 18 displays K, and key position 19 displays T, and key position 20 displays H. Key position 21 displays V, and key position 22 displays R, and key position 23 displays W, and key position 24 displays L, and key position 25 displays Y.

E key position of P key displays the Chinese phonetic letter U, and E key position of C key displays the Chinese phonetic letter O, and E key position of K key displays the Chinese phonetic letter Ë.

OTHER LAYOUTS OF THE EXAMPLES

For J key, A key position displays Esc, and B key position displays space sign, and C key position displays tilde, and F key position displays XOR mark. For I key, A key position displays flight, and B key position displays 00, and C key position displays 000, and F key position displays F6. For Q key, A key position displays setting, and B key position displays minus sign, and C key position displays hyphen, and F key position displays emoticon. For N key, A key position displays window selection, and B key position displays equal sign, and C key position displays plus sign, and F key position displays F7. For X key, A key position displays line beginning, and B key position displays Backspace mark, and C key position displays Del, and F key position displays CH/EN.

For B key, A key position displays editing, and B key position displays [, and C key position displays {, and F key position displays size. For U key, A key position displays refresh, and B key position displays 7, and C key position displays &, and F key position displays F5. For P key, A key position displays screenshot, and B key position displays 8, and C key position displays *. For M key, A key position displays projection, and B key position displays 9, and C key position displays (, and F key position displays F8. For F key, A key position displays line end, and B key position displays comma, and C key position displays, and F key position displays Chinese/English.

For Z key, A key position displays Tab, and B key position displays ], and C key position displays}, and F key position displays complete/simplified. For A key, A key position displays window closing, and B key position displays 4, and C key position displays, and F key position displays F4. For C key, A key position displays adding, and B key position displays 5, and C key position displays %. For D key, A key position displays key light, and B key position displays 6, and C key position displays . . . , and F key position displays F9. For S key, A key position displays previous page, and B key position displays full stop, and C key position displays, and F key position displays sound form.

For G key, A key position displays capital, and B key position displays enumeration comma, C key position displays |, and F key position displays numeric marks. For E key, A key position displays mute, and B key position displays 1, and C key position displays exclamation mark, and F key position displays F3. For K key, A key position displays five tones, and B key position displays 2, and C key position displays @. For T key, A key position displays screen off, and B key position displays 3, and C key position displays #, and F key position displays F10. For H key, A key position displays next page, and B key position displays /, and C key position displays ?, and F key position displays simplified/traditional.

For V key, A key position displays volume down, and B key position displays a semicolon, and C key position displays a colon, and F key position displays F1. For R key, A key position displays volume up, and B key position displays 0, and C key position displays), and F key position displays F2. For W key, A key position displays up, and F key position displays down. For L key, A key position displays light down, and B key position displays decimal point, and C key position displays syllable-dividing mark, and F key position displays F11. For Y key, A key position displays light up, and B key position displays single quotation mark, and C key position displays double quotation mark, and F key position displays F12, see FIG. 8.

On the basis of a 25-key keyboard arranged in an array of 5 rows and 5 columns, and a row of 5 keys is added to the lower side to form a 30-key vertical keyboard arranged in an array of 6 rows and 5 columns.

The middle key positions of the five newly added keys are numbered from left to right as key positions 26, 27, 28, 29, and 30.

Layout of letter keys and function keys for the sixth row of keys.

Key position 26 displays the Chinese phonetic letter determining mark, and D key position of the key where key position 26 is located displays shift, and key position E displays start; key position 27 displays Ü, and D key position of the key where key position 27 is located displays control; key position 28 displays O, and D key position of the key where key position 28 is located displays function; key position 29 displays Ë, and D key position of the key where key position 29 is located displays window. Key 30 displays a space mark, and D key position of the key where key position 30 is located displays exchange, and E key position displays menu, see FIG. 9.

When there is input that is not determined to be on the screen, and a space mark becomes a drop-down mark, and a determining mark does not change. After the drop-down mark is used once, and the determining mark becomes a pull-up mark, and when pull-up times are equal to drop-down times, and the pull-up mark changes back to the determining mark. A determination function is used to determine an entered string to be displayed on the screen.

The CH-EN key is a switch key for inputting Chinese or English on a Chinese phonetic panel or an English panel, and the Chinese/English key is a switch key for the Chinese phonetic panel and the English panel. The remaining symbols or function keys are symbols and functions that are consistent with those of traditional keyboards, and meanings and functions thereof are consistent with those of the traditional keyboards.

Chinese phonetic input method of the examples.

Various display modes are determined according to input status and tone of each syllable.

The associative words or phrases are displayed in first 8 upper and lower candidate columns in keys in the third column of the 25-key keyboard. Upper and lower candidate columns of W key display pull-up and drop-down marks, and the pull-up and drop-down functions are used to refresh associative words or phrases, see FIG. 10.

Figure 10:
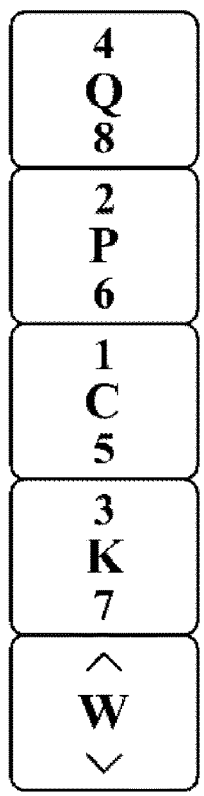
FIG. 10 is a schematic diagram displaying associative words of keys in third column of 25 keys in a main key area according to an example of the present invention.
Figure 11:
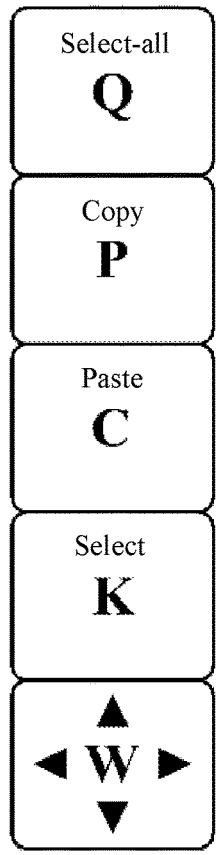
FIG. 11 is a schematic diagram displaying editing interface of keys in third column of 25 keys in a main key area according to an example of the present invention.

The numbers in FIG. 10 represent display and word or phrase frequency ranking, the smaller the number, the higher the frequency, and various situations of display and word or phrase frequency ranking are different. Please refer to the relevant schematic diagrams below for details.

Operating the editing key can switch the interface displaying associative words or phrases to an editing interface. After selecting all or selecting, select all of the Q key changes to Cut, see FIG. 11.

In a syllable-dividing mark input mode, when there is a spelling with entered letters, and left key positions of the Q, P, C and K keys sequentially display ai, ao, an and at, and right key positions of the P, C, K and W keys sequentially display ou, ian or uai, uan, and iat or uat.

Figure 12:
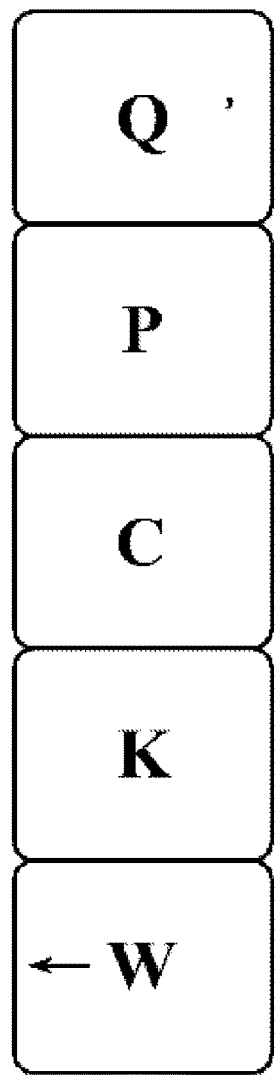
FIG. 12 is a schematic diagram displaying fourth tone in an input process of keys in third column of 25 keys in a main key area according to an example of the present invention.
Figure 13:
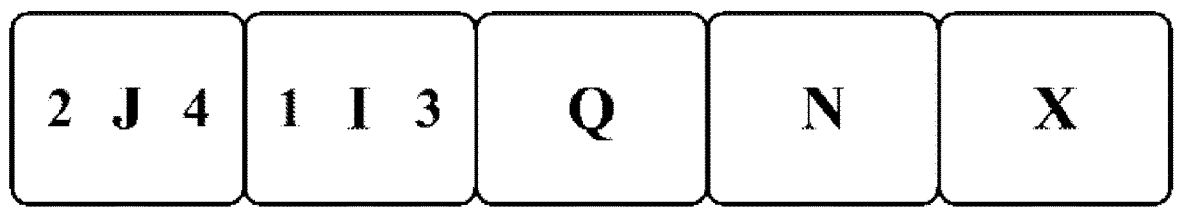
FIG. 13 is a schematic diagram of word frequency ranking displayed in no pre-spelling of a Chinese phonetic input method according to an example of the present invention.

In a five-tone input mode, after a first key for each syllable is input, 1, 2, 3, 4 or other words representing four tones are sequentially displayed in left key positions of the Q, P, C and K keys, and 5 or the syllable-dividing mark is displayed in right key position of the Q key, see FIG. 12.

After a first key for each syllable is input, 28 letters are individually formed into syllables, where each of 27 letters is spelled with a certain single vowel, and the single vowel part therein is omitted, which is called no pre-spelling, requiring manual input of a syllable-dividing mark. Words searched by inputting letter j, i, q, n, x, z, c, or s are displayed in first 4 left and right candidate columns of first row of keys.

Words searched by inputting letter b, u, p, m or f are displayed in first 4 left and right candidate columns of second row of keys.

Words searched by inputting letter a are displayed in first 4 left and right candidate columns of third row of keys.

Words searched by inputting letter g, e, k, h, d, t or l are displayed in first 4 left and right candidate columns of fourth row of keys.

Words searched by inputting letter v, r, w, y, ü or o are displayed in first 4 left and right candidate columns of fifth row of keys.

Figure 14:
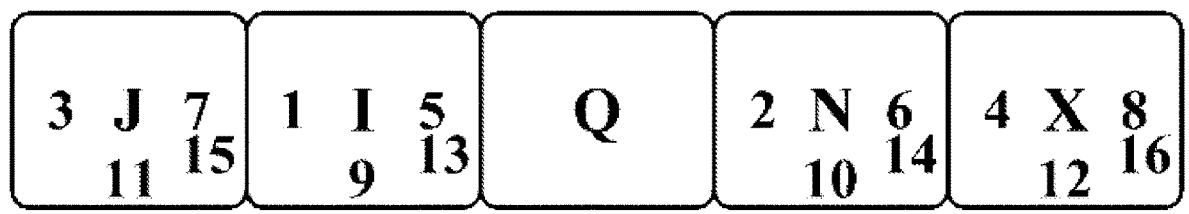
FIG. 14 is a schematic diagram of word frequency ranking of a five-tone display mode of a Chinese phonetic input method according to an example of the present invention.

After another letter ë is input, ë does not spell with other monophthongs, and when a syllable is completed, and a syllable-dividing mark is added automatically. Searched first-tone words are displayed in a total of 16 candidate columns on left, right, lower and middle right lower sides of first two and last two keys of the first row. Searched second-tone words are displayed in a total of 16 candidate columns on left, right, lower, and middle right lower sides of first two and last two keys of the second row. Searched third-tone words are displayed in a total of 16 candidate columns on left, right, lower, and middle right lower sides of first two and last two keys of the third row. Searched fourth-tone words are displayed in a total of 16 candidate columns on left, right, lower, and middle right lower sides of first two and last two keys of the fourth row. Searched fifth-tone words are displayed in a total of 16 candidate columns on left, right, lower, and middle right lower sides of first two and last two keys of the fifth row. The tone of a word, word, or whole sentence refers to the tone of the last word. The display mode by tone is called a five-tone display mode, and the display and word or phrase frequency ranking are shown in FIG. 14.

Figure 15:
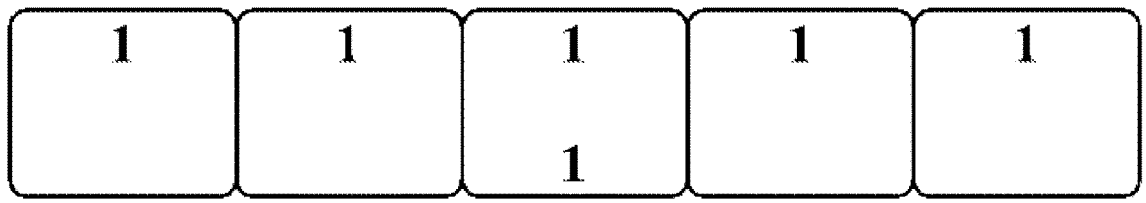
FIG. 15 is a schematic diagram of word frequency ranking displayed on keys in second, third and fourth rows in pre-simplified spelling of a Chinese phonetic input method according to an example of the present invention.

After the first key for each syllable is input, an entered letter has a simplified spelling with another letter, which is called a pre-simplified spelling. In the case of pre-simplified spelling, searched words are displayed in upper candidate columns of 25 keys and lower candidate columns of 3 keys. An entered letter has a pre-simplified spelling with a middle key position letter of a certain key, and then searched words are displayed in upper candidate column of the key. An entered letter has a pre-simplified spelling with an E key position letter of a certain key, and then searched words are displayed in lower candidate column of the key. The display mode is called a pre-simplified spelling display mode, and the display and word or phrase frequency ranking of keys in second, third and fourth rows are shown in FIG. 15.

Figure 16:
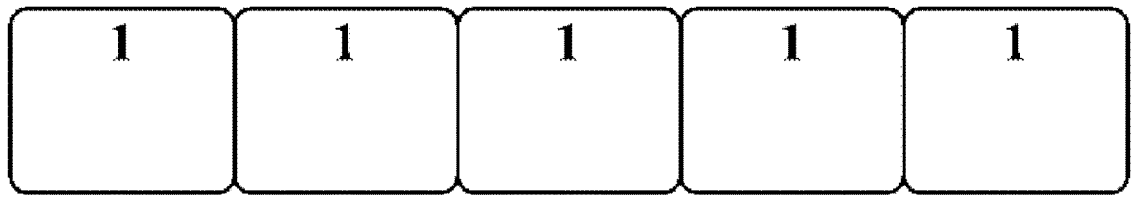
FIG. 16 is a schematic diagram of word frequency ranking displayed on keys in first and fifth rows in pre-simplified spelling of a Chinese phonetic input method according to an example of the present invention.

The display and word or phrase frequency ranking of keys in first and fifth rows are shown in FIG. 16.

After the first key for each syllable is input, and an entered letter has a complete spelling with another letter or final, which is called a pre-complete spelling. Words searched by pre-complete spelling with i are displayed in first 4 left and right candidate columns of the first row of keys.

Words searched by pre-complete spelling with u are displayed in first 4 left and right candidate columns of the second row of keys.

Words searched by pre-complete spelling with a are displayed in first 4 left and right candidate columns of the third row of keys.

Words searched by pre-complete spelling with e are displayed in first 4 left and right candidate columns of the fourth row of keys.

Words searched by pre-complete spelling with ü or o are displayed in first 4 left and right candidate columns of the fifth row of keys.

Words searched by pre-complete spelling with n are displayed in last 4 left and right candidate columns of the first row of keys.

Words searched by pre-complete spelling with an are displayed in last 4 left and right candidate columns of the second row of keys.

Words searched by pre-complete spelling with ai are displayed in last 4 left and right candidate columns of the third row of keys.

Words searched by pre-complete spelling with t are displayed in last 4 left and right candidate columns of the fourth row of keys.

Figure 17:
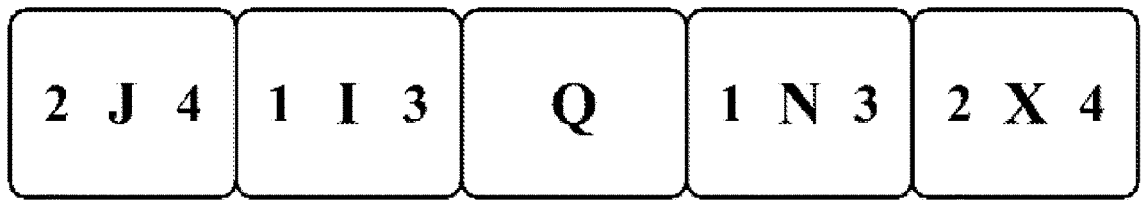
FIG. 17-FIG. 20 are schematic diagrams of word frequency ranking displayed in pre-complete spelling of a Chinese phonetic input method according to an example of the present invention.

Words searched by pre-complete spelling with at are displayed in last 4 left and right candidate columns of the fifth row of keys. The display and word or phrase frequency ranking of keys are shown in FIG. 17.

Words searched by pre-complete spelling with ei are displayed in 4 lower candidate columns of first two and last two keys of the first row.

Words searched by pre-complete spelling with ou are displayed in 4 lower candidate columns of first two and last two keys of the second row.

Words searched by pre-complete spelling with ao are displayed in 4 lower candidate columns of first two and last two keys of the third row.

Words searched by pre-complete spelling with ot are displayed in 4 lower candidate columns of first two and last two keys of the fourth row.

Figure 18:
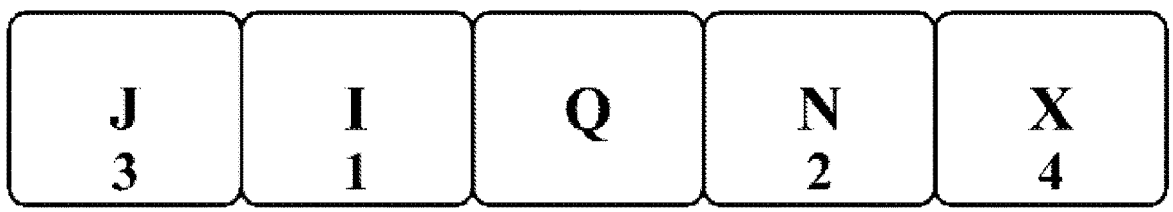

Words searched by pre-complete spelling with ue are displayed in 4 lower candidate columns of first two and last two keys of the fifth row. The display and word or phrase frequency ranking are shown in FIG. 18.

Words searched by pre-complete spelling with ia or ua are displayed in first two middle right lower candidate columns of the first row of keys.

Words searched by pre-complete spelling with ie or uai are displayed in last two middle right lower candidate columns of the first row of keys.

Words searched by pre-complete spelling with io or uat are displayed in first two middle right lower candidate columns of the second row of keys.

Words searched by pre-complete spelling with ian are displayed in last two middle right lower candidate columns of the second row of keys.

Words searched by pre-complete spelling with in or ui are displayed in first two middle right lower candidate columns of the third row of keys.

Words searched by pre-complete spelling with iat are displayed in last two middle right lower candidate columns of the third row of keys.

Words searched by pre-complete spelling with it are displayed in first two middle right lower candidate columns of the fourth row of keys.

Words searched by pre-complete spelling with uo are displayed in last two middle right lower candidate columns of the fourth row of keys.

Words searched by pre-complete spelling with uan are displayed in first two middle right lower candidate columns of the fifth row of keys.

Figure 19:

Words searched by pre-complete spelling with un are displayed in last two middle right lower candidate columns of the fifth row of keys. The display and word or phrase frequency ranking of first two and last two keys in each row are shown in FIG. 19.

Figure 20:
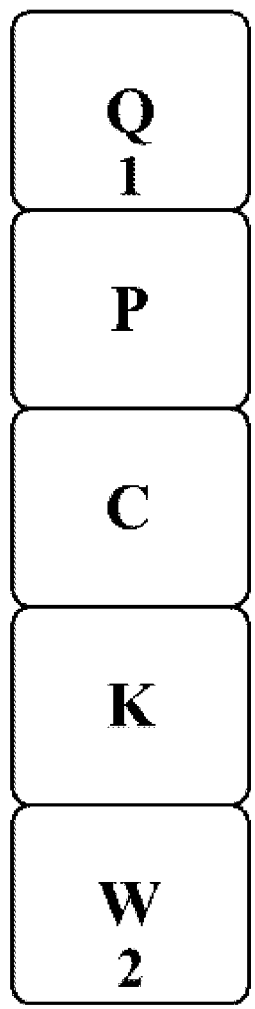

Words searched by pre-complete spelling with iu are displayed in lower candidate columns of Q key and W key. The display and word or phrase frequency ranking are shown in FIG. 20.

Only the actually entered word string is displayed in a text box, and the word string of the original scheme as comparison and the automatically added syllable-dividing mark are displayed in the lower candidate column of the W key. When the letter entered as the first key of each syllable is consistent with the original scheme, it is not displayed, when the letter is inconsistent with the original scheme, the comparison is displayed, and the display in the lower candidate column of the W key does not conflict.

After a second key for each syllable is input, and an entered letter has a pre-simplified spelling with another arbitrary letter, and a pre-simplified spelling display mode in FIG. 15 and FIG. 16 is applied.

After a second key for each syllable is input, and if first two keys are spellable, and continuous pre-complete spelling still exists, and searched words are displayed in left and right candidate columns, and a pre-complete spelling display mode in FIG. 17 is applied in this case.

Figure 21:
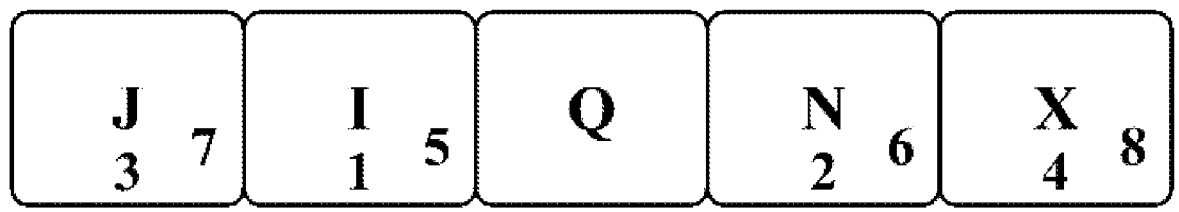
FIG. 21 is a schematic diagram of word frequency ranking displayed in no pre-simplified spelling of a Chinese phonetic input method when entered letters are spellable according to an example of the present invention.

After the second key for each syllable is input, and even if entered letters are spellable, there is still a calculation channel that is completely processed according to simplified spelling, and first-tone words searched according to no pre-simplified spelling are displayed in lower and middle right lower candidate columns of first two and last two keys of the first row. Second-tone words searched according to no pre-simplified spelling are displayed in lower and middle right lower candidate columns of first two and last two keys of the second row. Third-tone words searched according to no pre-simplified spelling are displayed in lower and middle right lower candidate columns of first two and last two keys of the third row. Fourth-tone words searched according to no pre-simplified spelling are displayed in lower and middle right lower candidate columns of first two and last two keys of the fourth row. Fifth-tone words searched according to no pre-simplified spelling are displayed in lower and middle right lower candidate columns of first two and last two keys of the fifth row. The display and word or phrase frequency ranking of keys in each row are shown in FIG. 21.

After the second key for each syllable are input, and entered letters are not spellable, and then searched first-tone words are displayed in 16 left, right, lower and middle right lower candidate columns of first two and last two keys of the first row. Searched second-tone words are displayed in 16 left, right, lower, and middle right lower candidate columns of first two and last two keys of the second row. Searched third-tone words are displayed in 16 left, right, lower, and middle right lower candidate columns of first two and last two keys of the third row. Searched fourth-tone words are displayed in 16 left, right, lower, and middle right lower candidate columns of first two and last two keys of the fourth row. Searched fifth-tone words are displayed in 16 left, right, lower, and middle right lower candidate columns of first two and last two keys of the fifth row. A five-tone display mode in FIG. 14 is applied for the display and word or phrase frequency ranking.

After a syllable-dividing mark is manually input for a second key of each syllable, and the five-tone display mode in FIG. 14 is applied.

A syllable tail letter is input for the second key of each syllable, and one syllable is completed, and a syllable-dividing mark is added automatically, and the five-tone display mode in FIG. 14 is applied.

After a third key is input, each syllable is processed the same way with that after input of the second key.

After a fourth key for each syllable is input, and a syllable-dividing mark is added automatically, and the five-tone display mode in FIG. 14 is applied.

When Chinese phonetic input exceeds a certain number of syllables and has a pre-simplified spelling, neither left and right candidate columns nor middle right lower candidate columns have enough space for complete display, and then the input is displayed in upper candidate columns. According to no pre-simplified spelling, searched first-tone words are displayed in 4 lower candidate columns of first two and last two keys of the first row. Searched second-tone words are displayed in 4 lower candidate columns of first two and last two keys of the second row. Searched third-tone words are displayed in 4 lower candidate columns of first two and last two keys of the third row. Searched fourth-tone words are displayed in 4 lower candidate columns of first two and last two keys of the fourth row. Searched fifth-tone words are displayed in 4 lower candidate columns of first two and last two keys of the fifth row.

Calligraphical code input method of the examples.

The change rules of functional symbols and symbols in the associative word interface, editing interface, and input process are the same as those in the Chinese phonetic input method.

The 28 Latin letters in the Chinese phonetic scheme represent calligraphical code words, and each Latin letter represents a key code. At most 8 times of coding is performed on each Chinese word, and according to the coding sequence, the first key code is formed by the first and second times of coding, and the second key code is formed by the third and fourth times of coding, and the third key code is formed by the fifth and sixth times of coding, and the fourth key code is formed by the seventh and eighth times of coding. The first key codes of Chinese words are spelled, which is called a simplified spelling of the calligraphical codes. And the first, second, third, and fourth key codes of a Chinese word are spelled, which is called a complete spelling of the calligraphical codes. The syllable-dividing mark in the calligraphical code input method is a simplified spelling and complete spelling terminator.

After inputting a few key codes for a calligraphical code simplified spelling, and entered key codes have a simplified spelling with a key code of a middle key position of a key, and 25 words with first word frequency ranking are displayed in the upper candidate column of the key where the key code is located, and 22 words with second word frequency ranking are displayed in the lower candidate column of the key where the key code is located. The entered key codes have a simplified spelling with a key code of a middle right lower key position of a key, and 3 words with first word frequency ranking are displayed in the lower candidate column of the key where the key code is located. The display and word or phrase frequency ranking are shown in FIG. 22.

The syllable-dividing mark is input during the calligraphical code simplified spelling to terminate the simplified spelling, simply spelled words of a certain number of words are searched after the certain number of key codes are input, and the simply spelled words are displayed according to word or phrase frequency ranking shown in FIG. 23.

Figure 24:
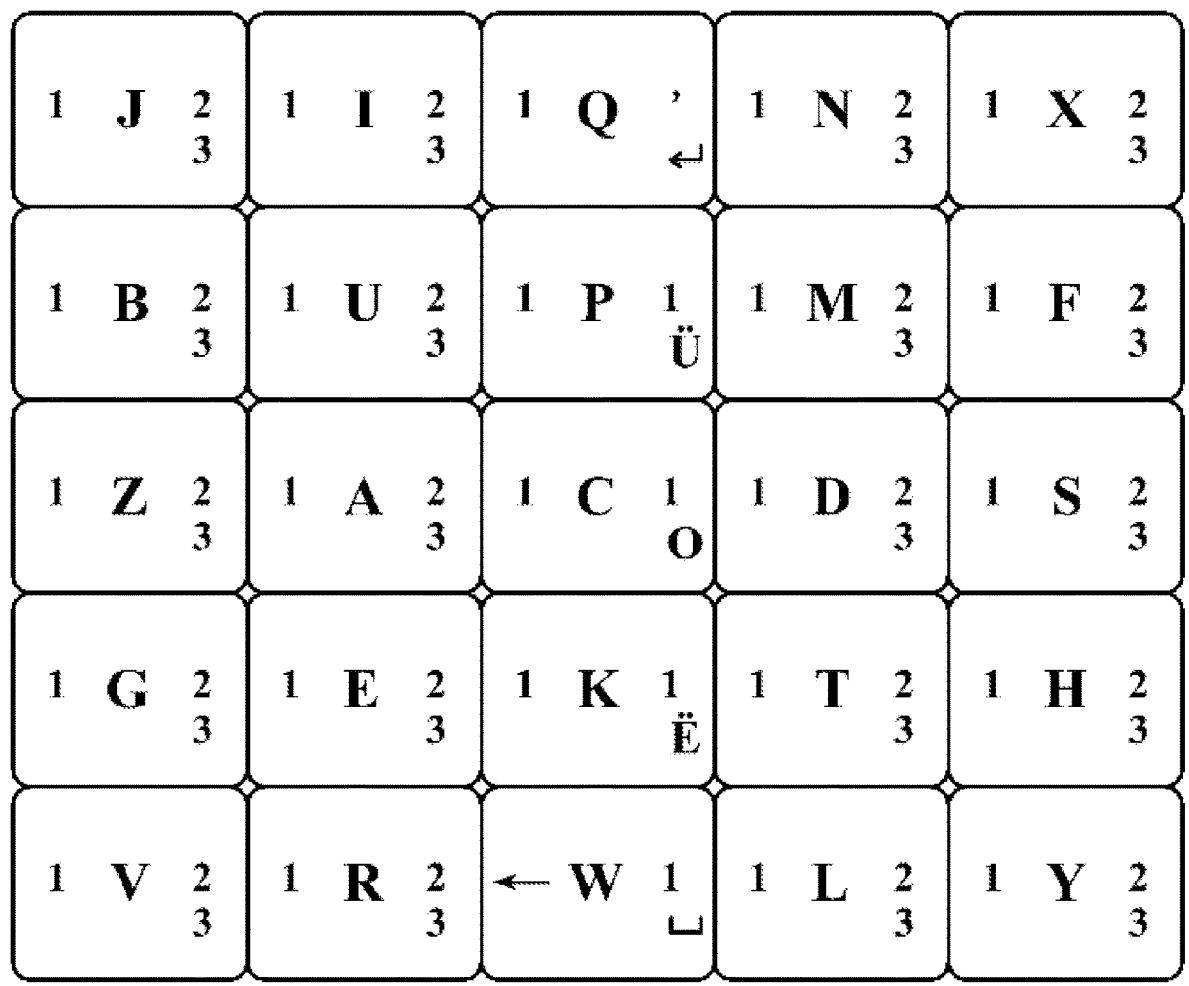
FIG. 24 is schematic diagram of word frequency ranking displayed in pre-complete spelling of a calligraphical code input method according to an example of the present invention.

After inputting a few key codes for a calligraphical code complete spelling, and entered key codes have a complete spelling with a key code of a middle key position of a key, and 24 words with first word frequency ranking are displayed in the left candidate column of the key where the key code is located, and I word with first word frequency ranking is displayed in the right candidate column of the key where the key code is located. The entered key codes have a complete spelling with a key code of a middle right lower key position of a key, and 3 words with first word frequency ranking are displayed in the right candidate column of the key where the key code is located. 20 words with second word frequency ranking are displayed in the right candidate column of the key where the key code is located. 20 words with third word frequency ranking are displayed in the middle right lower candidate column of the key where the key code is located. The display and word or phrase frequency ranking are shown in FIG. 24.

Figure 25:
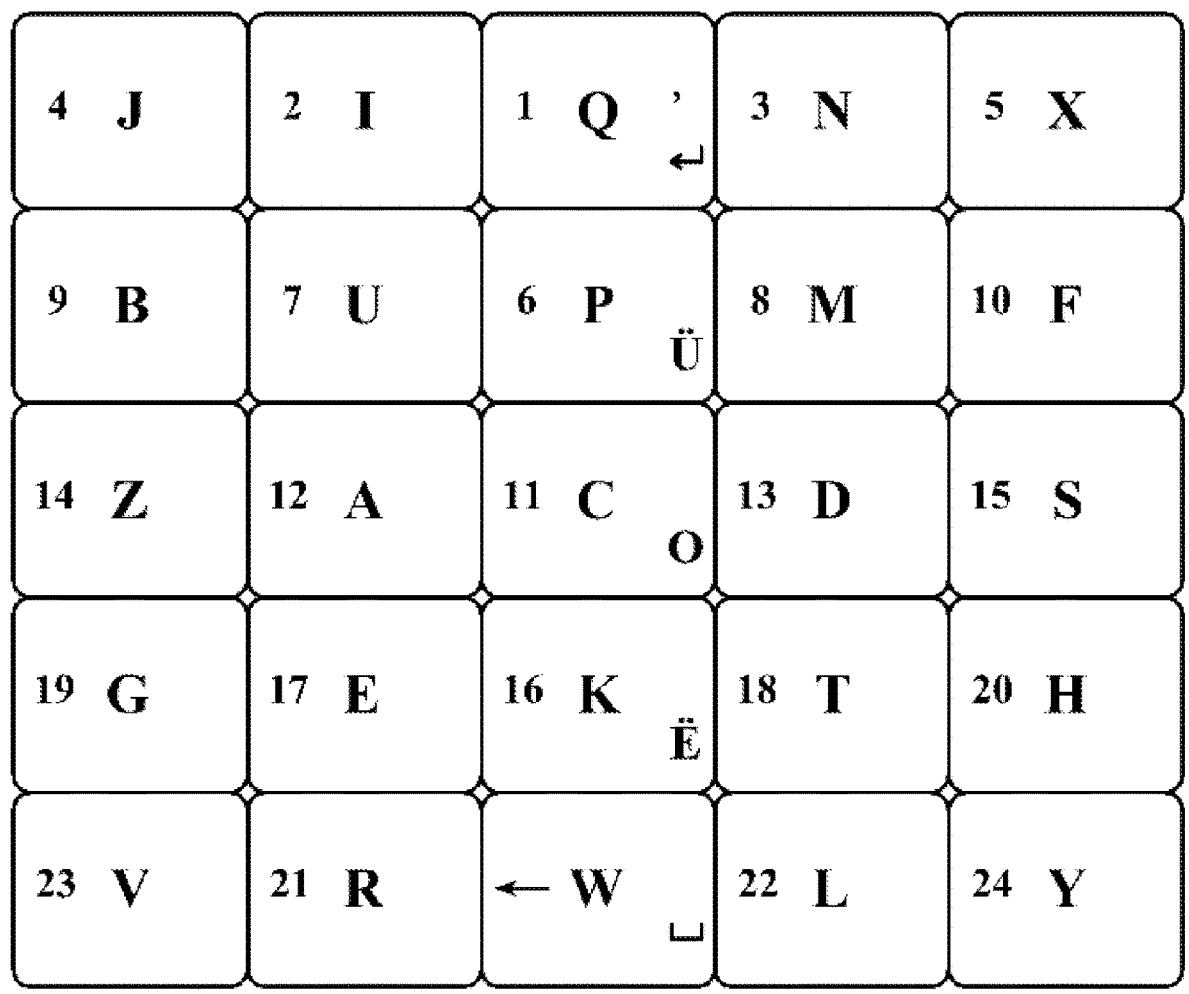
FIG. 25 is a schematic diagram of word frequency ranking displayed in pre-complete spelling of a calligraphical code input method after a syllable-dividing mark is input according to an example of the present invention.

The syllable-dividing mark is input during the calligraphical code complete spelling to terminate the complete spelling, and four key codes are enough for one word, and finally remaining one, two, or three key codes are also counted as one word, and completely spelled words of a certain number of words are searched after the certain number of key codes are input, and the completely spelled words are displayed according to word or phrase frequency ranking shown in FIG. 25.

English input method of the examples.

The change rules of functional symbols and symbols in the associative word interface, editing interface, and input process are the same as those in the Chinese phonetic input method. English keyboard layout is shown in FIG. 26.

After one key of letter is input in an English input method, and the next key, which is a word with a certain first unentered letter, is displayed in the candidate column of the key with the certain letter in the middle key position, and only subsequent parts of the first unentered letter are displayed in the candidate column. Sliding once or pressing and holding for input is performed to determine entered letters being not determined to be on screen+the letter in the middle key position+letter strings displayed in the relevant candidate columns to be on the screen, or to determine the entered letters being not determined to be on screen+the letter in the middle right lower key position+the letter strings displayed in the relevant candidate columns to be on the screen.

After one key of letter is input in an English input method, and the next key is a word with the letter Q, and the subsequent letter string of Q is displayed in the lower candidate column of the F key. The next key is a word with the letter F and the subsequent letter string of F is displayed in the remaining three candidate columns of the F key.

The next key is a word with the letter R and the subsequent letter string of R is displayed in the upper, left and lower candidate columns of the R key.

The next key is a word with the letter B and the subsequent letter string of B is displayed in the upper, right and lower candidate columns of the B key.

The next key is a word with the letter O or L and the subsequent letter string of O or L is displayed in the upper, lower, left and right candidate columns of the O or L key.

Figure 27:
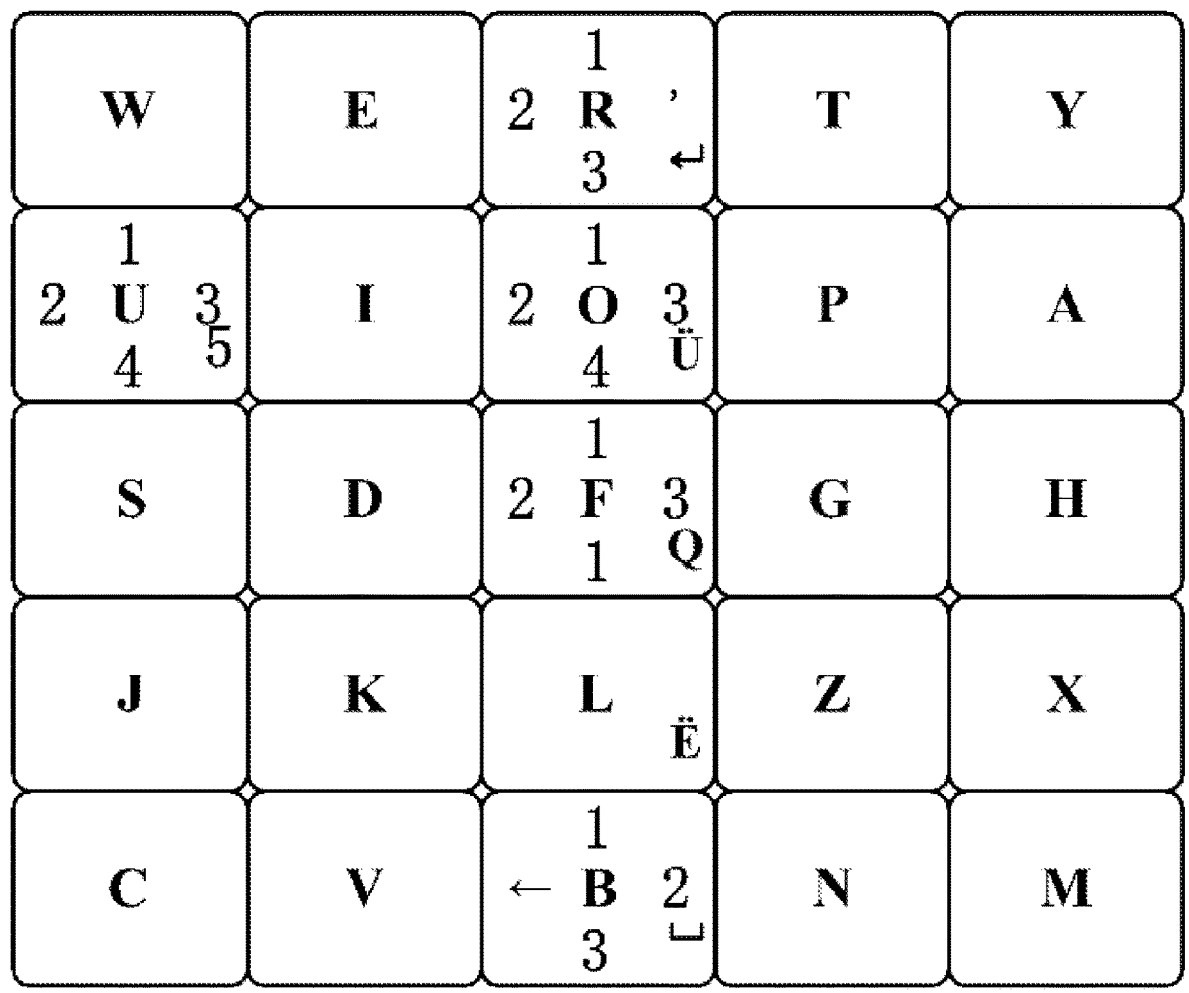
FIG. 27 is a schematic diagram of word frequency ranking displayed in an English input method according to an example of the present invention.

The next key is a word with each of the remaining 20 letters and the subsequent letter string of each letter is displayed in the upper, lower, left, right and middle right lower candidate columns of the key where the letter is located. The display and word or phrase frequency ranking are shown in FIG. 27.

The Chinese phonetic input method based on the new Chinese phonetic scheme of the present invention simplifies phonetic and can achieve convenient Chinese phonetic input on computers, mobile phones, watches, mice and other devices, and has the advantages of easy learning, high input efficiency, and low error rate. The present invention uses a unified set of 28 Chinese phonetic letters, English Latin letters and calligraphical code letters to facilitate switching between the three types of letters. By means of 25-key layout as the basis of multiple keyboards in the present invention, multiple keyboard layouts are not required to be memorized for input from multiple platforms such as computers, mobile phones and watches, and learning costs are low. The present invention cancels the existing candidate column way, making the relevant key positions of each key become candidate columns, and the number of candidate words and words increases significantly, making input faster.

The present invention and the implementation manner thereof are described above, the description is not limited, the content shown in the drawings is only one of the implementation manner of the present invention, and actual examples are not limited thereto. In summary, if those of ordinary skill in the art are inspired by the present invention and uncreatively design structural methods and examples similar to the technical solution without departing from the purpose of the present invention, they shall all fall within the scope of protection of the present invention.

What is claimed is:

1. A keyboard based on key position layout, comprising:
   a keyboard body;
   wherein the keyboard body is provided with a main key area formed by 25 keys arranged in an array of 5 rows and 5 columns; and
   each key is divided into seven key positions comprising A key position, B key position, middle key position, C key position, D key position, E key position and F key position from top to bottom and from left to right sequentially;
   wherein 28 letter key positions formed by all middle key positions of the 25 keys in the main key area and E key positions of 3 keys are configured to display and in one-to-one correspondence with 28 input method letters.

2. An input method of a keyboard based on key position layout applied to an electronic device, wherein the keyboard based on key position layout according to claim 1 is used; and
   input method letters are Chinese phonetic letters, calligraphical code letters and English Latin letters; and
   seven key positions occupy seven partitions; the position of A key position is called upper partition; the position of B key position is called left partition; the position of middle key position is called middle partition; the position of C key position is called right partition; the position of D key position is called middle left lower partition; the position of E key position is called middle right lower partition, and the position of F key position is called lower partition; and
   after one key of input method letters is input, the remaining empty upper, left, right, lower or middle right lower partitions except upper, left, right, lower or middle right lower partitions where the 28 input method letters, a determining mark, a space mark, a backspace mark and a syllable-dividing mark are located are used as candidate columnstodisplaywords or phrases searched through various input methods; and content displayed in the middle key position of each key is input by clicking the key; content displayed in the A key position of the key is input or implemented by pressing and holding the key and sliding upward; content displayed in the B key position of the key is input or implemented by pressing and holding the key and sliding leftward; content displayed in the C key position of the key is input or implemented by pressing and holding the key and sliding rightward; content displayed in the D key position of the key is a key combination function key, and predetermined key combination functions are implemented by long pressing the key and clicking other related keys; content displayed in the E key position of the key is input by long pressing the key; and content displayed in the F key position of the key is input or implemented by pressing and holding the key and sliding downward.

3. The input method of the keyboard based on key position layout applied to the electronic device according to claim 2, wherein after a first key for each syllable is input, and 28 letters are individually formed into syllables;

wherein each of 27 letters is spelled with a certain single vowel, and the single vowel part therein is omitted, which is called no pre-spelling, requiring manual input of a syllable-dividing mark;

words searched by inputting letter j, i, q, n, x, z, c, or s are displayed in first 4 left and right candidate columns of first row of keys;

words searched by inputting letter b, u, p, m or f are displayed in first 4 left and right candidate columns of second row of keys;

words searched by inputting letter a are displayed in first 4 left and right candidate columns of third row of keys;

words searched by inputting letter g, e, k, h, d, t or l are displayed in first 4 left and right candidate columns of fourth row of keys;

words searched by inputting letter v, r, w, y, ü or o are displayed in first 4 left and right candidate columns of fifth row of keys; and after another letter ë is input, ë does not spell with other monophthongs, and when a syllable is completed, a syllable-dividing mark is added automatically;

searched first-tone words are displayed in a total of 16 candidate columns on left, right, lower and middle right lower sides of first two and last two keys of the first row;

searched second-tone words are displayed in a total of 16 candidate columns on left, right, lower, and middle right lower sides of first two and last two keys of the second row;

searched third-tone words are displayed in a total of 16 candidate columns on left, right, lower, and middle right lower sides of first two and last two keys of the third row;

searched fourth-tone words are displayed in a total of 16 candidate columns on left, right, lower, and middle right lower sides of first two and last two keys of the fourth row; and searched fifth-tone words are displayed in a total of 16 candidate columns on left, right, lower, and middle right lower sides of first two and last two keys of the fifth row.

4. The input method of the keyboard based on key position layout applied to the electronic device according to claim 2, wherein after the first key for each syllable is input, an entered letter has a simplified spelling with another letter, which is called a pre-simplified spelling;

in the case of pre-simplified spelling, searched words are displayed in upper candidate columns of 25 keys and lower candidate columns of 3 keys;

an entered letter has a pre-simplified spelling with a middle key position letter of a certain key, and then searched words are displayed in upper candidate column of the key; and an entered letter has a pre-simplified spelling with an E key position letter of a certain key, and then searched words are displayed in lower candidate column of the key.

5. The input method of the keyboard based on key position layout applied to the electronic device according to claim 2, wherein after the first key for each syllable is input, an entered letter has a complete spelling with another letter or final, which is called a pre-complete spelling;

words searched by pre-complete spelling with i are displayed in first 4 left and right candidate columns of the first row of keys;

words searched by pre-complete spelling with u are displayed in first 4 left and right candidate columns of the second row of keys;

words searched by pre-complete spelling with a are displayed in first 4 left and right candidate columns of the third row of keys;

words searched by pre-complete spelling with e are displayed in first 4 left and right candidate columns of the fourth row of keys;

words searched by pre-complete spelling with ü or o are displayed in first 4 left and right candidate columns of the fifth row of keys;

words searched by pre-complete spelling with n are displayed in last 4 left and right candidate columns of the first row of keys;

words searched by pre-complete spelling with an are displayed in last 4 left and right candidate columns of the second row of keys;

words searched by pre-complete spelling with ai are displayed in last 4 left and right candidate columns of the third row of keys;

words searched by pre-complete spelling with t are displayed in last 4 left and right candidate columns of the fourth row of keys; and words searched by pre-complete spelling with at are displayed in last 4 left and right candidate columns of the fifth row of keys.

6. The input method of the keyboard based on key position layout applied to the electronic device according to claim 2, wherein after the first key for each syllable is input, an entered letter has a complete spelling with another letter or final, which is called a pre-complete spelling;

words searched by pre-complete spelling with ei are displayed in 4 lower candidate columns of first two and last two keys of the first row;

words searched by pre-complete spelling with ou are displayed in 4 lower candidate columns of first two and last two keys of the second row;

words searched by pre-complete spelling with ao are displayed in 4 lower candidate columns of first two and last two keys of the third row;

words searched by pre-complete spelling with ot are displayed in 4 lower candidate columns of first two and last two keys of the fourth row; and words searched by pre-complete spelling with ue are displayed in 4 lower candidate columns of first two and last two keys of the fifth row.

7. The input method of the keyboard based on key position layout applied to the electronic device according to claim 2, wherein after the first key for each syllable is input, an entered letter has a complete spelling with another letter or final, which is called a pre-complete spelling;

words searched by pre-complete spelling with ia or ua are displayed in first two middle right lower candidate columns of the first row of keys;

words searched by pre-complete spelling with ie or uai are displayed in last two middle right lower candidate columns of the first row of keys;

words searched by pre-complete spelling with io or uat are displayed in first two middle right lower candidate columns of the second row of keys;

words searched by pre-complete spelling with ian are displayed in last two middle right lower candidate columns of the second row of keys;

words searched by pre-complete spelling with in or ui are displayed in first two middle right lower candidate columns of the third row of keys;

words searched by pre-complete spelling with iat are displayed in last two middle right lower candidate columns of the third row of keys;

words searched by pre-complete spelling with it are displayed in first two middle right lower candidate columns of the fourth row of keys;

words searched by pre-complete spelling with uo are displayed in last two middle right lower candidate columns of the fourth row of keys;

words searched by pre-complete spelling with uan are displayed in first two middle right lower candidate columns of the fifth row of keys;

words searched by pre-complete spelling with un are displayed in last two middle right lower candidate columns of the fifth row of keys; and words searched by pre-complete spelling with iu are displayed in lower candidate columns of Q key and W key.

8. The input method of the keyboard based on key position layout applied to the electronic device according to claim 2, wherein after a second key for each syllable is input, an entered letter has a pre-simplified spelling with another arbitrary letter, and a pre-simplified spelling display mode is applied; and after two keys for one syllable are input, if first two keys are spellable, and continuous pre-complete spelling still exists, and searched words are displayed in left and right candidate columns, and a pre-complete spelling display mode is applied;

even if entered letters are spellable, there is still a calculation channel that is completely processed according to simplified spelling, and first-tone words searched according to no pre-simplified spelling are displayed in lower and middle right lower candidate columns of first two and last two keys of the first row; second-tone words searched according to no pre-simplified spelling are displayed in lower and middle right lower candidate columns of first two and last two keys of the second row; third-tone words searched according to no pre-simplified spelling are displayed in lower and middle right lower candidate columns of first two and last two keys of the third row; fourth-tone words searched according to no pre-simplified spelling are displayed in lower and middle right lower candidate columns of first two and last two keys of the fourth row;

fifth-tone words searched according to no pre-simplified spelling are displayed in lower and middle right lower candidate columns of first two and last two keys of the fifth row;

entered letters are not spellable, and then searched first-tone words are displayed in 16 left, right, lower and middle right lower candidate columns of first two and last two keys of the first row; searched second-tone words are displayed in 16 left, right, lower, and middle right lower candidate columns of first two and last two keys of the second row; searched third-tone words are displayed in 16 left, right, lower, and middle right lower candidate columns of first two and last two keys of the third row; searched fourth-tone words are displayed in 16 left, right, lower, and middle right lower candidate columns of first two and last two keys of the fourth row; searched fifth-tone words are displayed in 16 left, right, lower, and middle right lower candidate columns of first two and last two keys of the fifth row; a five-tone display mode is applied;

after a syllable-dividing mark is manually input for a second key, and the five-tone display mode is applied;

a syllable tail letter is input for the second key, and one syllable is completed, and a syllable-dividing mark is added automatically, and the five-tone display mode is applied;

after a third key is input, and each syllable is processed the same way with that after input of the second key; and after a fourth key for each syllable is input, and a syllable-dividing mark is added automatically, and the five-tone display mode is applied.

9. The input method of the keyboard based on key position layout applied to the electronic device according to claim 2, wherein when Chinese phonetic input exceeds a certain number of syllables and has a pre-simplified spelling, neither left and right candidate columns nor middle right lower candidate columns have enough space for complete display, and then the input is displayed in upper candidate columns; according to no pre-simplified spelling, and searched first-tone words are displayed in 4 lower candidate columns of first two and last two keys of the first row; searched second-tone words are displayed in 4 lower candidate columns of first two and last two keys of the second row; searched third-tone words are displayed in 4 lower candidate columns of first two and last two keys of the third row; searched fourth-tone words are displayed in 4 lower candidate columns of first two and last two keys of the fourth row; and searched fifth-tone words are displayed in 4 lower candidate columns of first two and last two keys of the fifth row.

10. The input method of the keyboard based on key position layout applied to the electronic device according to claim 2, wherein after inputting a few key codes for a calligraphical code simplified spelling, and entered key codes have a simplified spelling with a key code of a middle key position of a key, and 25 words with first word frequency ranking are displayed in the upper candidate column of the key where the key code is located, and 22 words with second word frequency ranking are displayed in the lower candidate column of the key where the key code is located; the entered key codes have a simplified spelling with a key code of a middle right lower key position of a key, 3 words with first word frequency ranking are displayed in the lower candidate column of the key where the key code is located; and a syllable-dividing mark is input during the calligraphical code simplified spelling to terminate the simplified spelling, simply spelled words of a certain number of words are searched after the certain number of key codes are input, and the simply spelled words are displayed according to word or phrase frequency ranking.

11. The input method of the keyboard based on key position layout applied to the electronic device according to claim 2, wherein after inputting a few key codes for a calligraphical code complete spelling, and entered key codes have a complete spelling with a key code of a middle key position of a key, and 24 words with first word frequency ranking are displayed in the left candidate column of the key where the key code is located, and 1 word with first word frequency ranking is displayed in the right candidate column of the key where the key code is located; the entered key codes have a complete spelling with a key code of a middle right lower key position of a key, and 3 words with first word frequency ranking are displayed in the right candidate column of the key where the key code is located; 20 words with second word frequency ranking are displayed in the right candidate column of the key where the key code is located; 20 words with third word frequency ranking are displayed in the middle right lower candidate column of the key where the key code is located; and a syllable-dividing mark is input during the calligraphical code complete spelling to terminate the complete spelling, four key codes are enough for one word, finally remaining one, two, or three key codes are also counted as one word, completely spelled words of a certain number of words are searched after the certain number of key codes are input, and the completely spelled words are displayed according to word or phrase frequency ranking.

12. The input method of the keyboard based on key position layout applied to the electronic device according to claim 2, wherein after one key of letter is input in an English input method, and the next key, which is a word with a certain first unentered letter, is displayed in the candidate column of the key with the certain letter in the middle key position, and only a subsequent part of the first unentered letter is displayed in the candidate column; sliding once or pressing and holding for input is performed to determine entered letters being not determined to be on screen+the letter in the middle key position+letter strings displayed in the relevant candidate columns to be on the screen, or to determine the entered letters being not determined to be on screen+the letter in the middle right lower key position+the letter strings displayed in the relevant candidate columns to be on the screen.

13. The input method of the keyboard based on key position layout applied to the electronic device according to claim 2, wherein after one key of letter is input in an English input method, and the next key is a word with the letter Q, and the subsequent letter string of Q is displayed in the lower candidate column of the F key;
- the next key is a word with the letter F and the subsequent letter string of F is displayed in the remaining three candidate columns of the F key;
- the next key is a word with the letter R and the subsequent letter string of R is displayed in the upper, left and lower candidate columns of the R key;
- the next key is a word with the letter B and the subsequent letter string of B is displayed in the upper, right and lower candidate columns of the B key;
- the next key is a word with the letter O or L and the subsequent letter string of O or L is displayed in the upper, lower, left and right candidate columns of the O or L key;
- the next key is a word with each of the remaining 20 letters and the subsequent letter string of each letter is displayed in the upper, lower, left, right and middle right lower candidate columns of the key where the letter is located.

\* \* \* \* \*